Apr. 24, 1923.
M. W. PAULING
1,452,755
GREASE RETAINER
Filed May 5, 1922
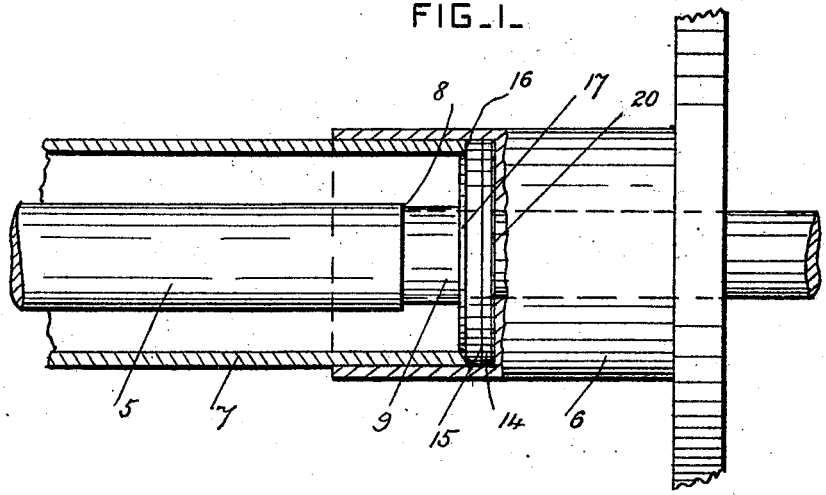
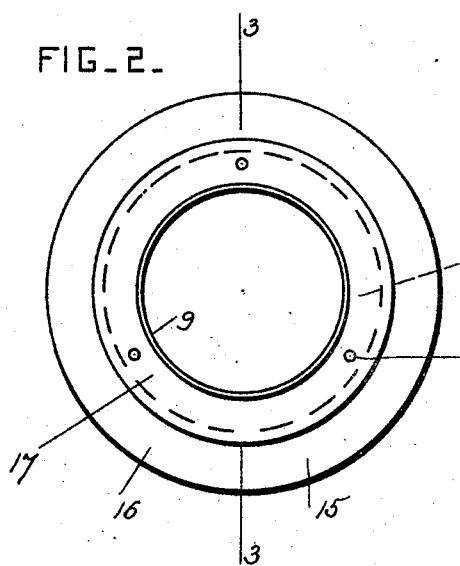
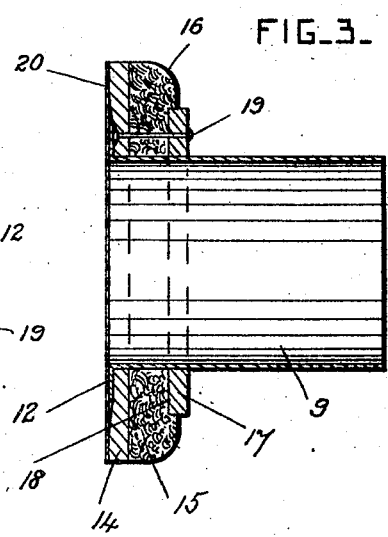
Inventor
Martin W. Pauling
by Herbert W. Jenner
Attorney Patented Apr. 24, 1923.

1,452,755

UNITED STATES PATENT OFFICE.

MARTIN W. PAULING, OF DOVER, MISSOURI.

GREASE RETAINER.

Application filed May 5, 1922. Serial No. 558,725.

*To all whom it may concern:*

Be it known that I, MARTIN W. PAULING, a citizen of the United States, residing at Dover, in the county of Lafayette and State of Missouri, have invented certain new and useful Improvements in Grease Retainers, of which the following is a specification.

This invention relates to washers suitable for retaining grease and specially adapted for use in connection with the driving axles of motor cars; and it consists in the novel construction and combination of the parts hereinafter fully described and claimed.

In the drawings, Figure 1 is a side view of a washer or grease retainer applied to the driving axle of a motor car, and showing a portion of the housing with parts broken away. Fig. 2 is a front or face view of the grease retainer, drawn to a larger scale. Fig. 3 is a section through the grease retainer, taken on the line 3—3 in Fig. 2.

The driving axle 5 of a motor car is arranged to revolve in a bearing 6 to which a tubular housing 7 is secured. The bearing 6 is of any approved construction, and a roller bearing is preferably used. One end portion of the axle 5 is connected to the differential gear inside the housing in the usual manner, and a road wheel is secured on the outer end portion of the axle.

In cars as ordinarily constructed grease is found to leak out of the housing around the bearing, and a washer constructed according to this invention is interposed between the end of the housing and the bearing to prevent this leak. The bearing is supported from the car frame by any approved means, and the tubular housing is arranged concentric with the bearing, and is secured to it in any approved way.

A shoulder 8 is formed on the axle inside the housing, and a sleeve 9 is slid on the axle so that it bears against this shoulder. The sleeve 9 has a flange 12 on the other end of it from the shoulder, and a large leather washer 14 is arranged on the sleeve against the flange 12. A felt washer 15 is arranged against the leather washer 14, and it has a rounded face 16 which bears against the end of the housing. The washers 14 and 15 are of the same diameter as the outside of the housing, and they are considerably larger in diameter than the flange 12. The flange 12 is very thin and does not require to be let into the side of the leather washer 14. A relatively small leather washer 17 is arranged on the sleeve against the washer 15, and fits inside the end portion of the housing, and is secured in a recess 18 in the felt washer. The washer 17 prevents the felt washer from being squeezed into the housing, and it is secured to the felt washer and the large washer by any approved means, such as stitches or rivets 19. Other similar flexible material may be used in place of leather for the washers 14 and 17.

A thin metallic washer 20, preferably of sheet steel, is interposed between the flange 12 and the bearing, and the large leather washer also bears against this metal washer.

The felt washer is re-inforced by the two leather washers. The device is held in position by the flanged sleeve, and it effectually prevents all objectionable leakage of grease from the housing.

What I claim is:

1. The combination, with a bearing, a tubular housing secured thereto, and an axle journaled in the bearing; of a grease retainer interposed between the bearing and the end of the housing and comprising a sleeve mounted on the axle and having a flange at one end, a large washer of flexible material bearing against the said flange, a felt washer interposed between the large washer and the end of the housing, a relatively small washer of flexible material secured to the felt washer and fitting inside the housing, and a metallic washer mounted on the axle and arranged between the said flange and the axle bearing and bearing against the outer side portion of the large washer.

2. The combination, in a grease retainer, of a supporting sleeve having a flange at one end, a large re-inforcing washer arranged on the sleeve against the said flange and projecting beyond it, a felt washer arranged against the large washer, and a relatively small re-inforcing washer secured to the said washers and arranged on the other side of the felt washer from the large washer leaving the outer portion of the felt washer exposed on one side.

In testimony whereof I have affixed my signature.

MARTIN W. PAULING.